(12) United States Patent
Lau et al.

(10) Patent No.: US 6,628,608 B1
(45) Date of Patent: Sep. 30, 2003

(54) METHOD AND APPARATUS OF HANDLING DATA THAT IS SENT TO NON-EXISTENT DESTINATIONS

(75) Inventors: Onchuen Lau, Saratoga, CA (US); Frank Chui, Sunnyvale, CA (US); Gene Chui, Campbell, CA (US); Gary Kipnis, Sunnyvale, CA (US); Gurmohan Samrao, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/277,518

(22) Filed: Mar. 26, 1999

(51) Int. Cl.[7] .............................................. G01R 31/08
(52) U.S. Cl. .................................. 370/218; 370/395.32
(58) Field of Search ................................ 709/223, 224, 709/225; 370/216–220, 225–228, 241, 241.1, 242–6, 252, 400–402, 445, 449, 238, 389, 395.1, 395.32; 345/736

(56) References Cited

U.S. PATENT DOCUMENTS

| | | | | |
|---|---|---|---|---|
| 6,151,688 A | * | 11/2000 | Wipfel et al. ................. 709/224 |
| 6,229,538 B1 | * | 5/2001 | McIntyre et al. ............ 345/349 |
| 6,252,849 B1 | * | 6/2001 | Rom et al. .................... 370/230 |
| 6,556,541 B1 | * | 4/2003 | Bare ............................ 370/235 |

* cited by examiner

*Primary Examiner*—David Vincent
(74) *Attorney, Agent, or Firm*—Blakely, Sokoloff, Taylor & Zafman LLP

(57) ABSTRACT

A method of managing a network switch. The method having the first step of detecting a status of a set of physical ports on an interface card in the network switch. Then, determining if the status is in a first state that indicates that all physical ports in the interface card are inaccessible. If the status is in the first state, then accepting all traffic for the set of physical ports. Also disclosed is an apparatus for performing the method.

14 Claims, 3 Drawing Sheets

METHOD AND APPARATUS OF HANDLING DATA THAT IS SENT TO NON-EXISTENT DESTINATIONS

FIELD OF THE INVENTION

This invention relates to the field of use of network devices. More particularly, the present invention relates to method and apparatus of handling data that is sent to non-existent destinations.

BACKGROUND

Organizations that have multiple locations with local area networks (LANs), also termed "campuses," may be interconnected by one or more wide area networks (WANs). WAN connections may run over media such as analog modem, leased line, integrated services digital network (ISDN), Frame Relay, switched multi-megabit data service (SMDS), X.25 and WAN asynchronous transfer mode (ATM).

Generally, a network device such as a switch may be used in a WAN as either an "edge" device to allow clients, servers, and LANs to communicate over the WAN, or a "core" device to make up the WAN. Typically, edge switches contain at least one interface card for communicating with the WAN (e.g., a WAN interface), and one interface card for communicating with either a client, a server, or a LAN (e.g., a LAN interface). Core switches typically only contain WAN interfaces, also referred to as "line cards," to connect to other core switches.

Each interface card has one switched port that includes one or more physical ports that may send or receive data, and the switch interconnects the physical ports to allow data received on a physical port on one interface card to be switched to a physical port on another interface card. For example, a physical port on a LAN interface may be connected to any physical port on a WAN interface. Similarly, a physical port on a WAN interface may be connected to any physical port on another WAN interface. Each physical port typically is identified as a "source" port or a "destination" port, depending on whether the physical port is sending data or receiving data, respectively. Each switched port typically has a buffer for queuing data to be transmitted. For ATM, the data is segmented into "cells" and the cells can be sent as bandwidth is available in a first in, first out, fashion.

To perform the switching, a switch may contain one or more switching elements, each of which is connected to all the ports in the switch and performs the switching between the ports. In addition, each switching element has an associated scheduler that controls the timing and scheduling of the switching. Each switching element and its associated scheduler is referred to as a "switch plane." Together, the set of switch planes is collectively known as a "switch fabric."

Each switch plane in the switch fabric operates independently of other switch planes, with no communication among the switch planes in the switch fabric. Each switch plane individually grants requests from the set of source ports in accordance with a predetermined algorithm. When a destination port is either congested (e.g., too much traffic directed at that physical port) or unreachable (e.g., the interface card containing that physical port has suffered a malfunction), the switch plane denies the granting of requests to that destination port. The cells in the buffer of the source port are transmitted if the congestion disappears or the malfunction is fixed.

If the destination port is unreachable for any reason (e.g., where the interface card containing the destination port is removed), then cells destined for that destination port continues to queue up and remain in the source port buffer. Cells that have been in the queue for some period of time and are unable to be transmitted are generally referred to as "stale cells." These stale cells reduce the amount of buffer space available to other cells, and decrease the switching efficiency. In a worst case scenario, if a source port buffer becomes full, no further cells are able to be added to the queue and any additional cells directed to the buffer are discarded, effectively shutting down operation of the source port.

One traditional system of removing stale cells includes the use of a software or hardware cleaning agent on each source port to periodically poll the destination ports and determine if they are operational. If the cleaning agent discovers that a destination port is not available, the cleaning agent would remove cells destined for that port from the buffer associated with the cleaning agent.

One disadvantage of the cleaning agent is that the functioning of the cleaning agent consumes valuable processing time from the processor. Another disadvantage is that the system is very inefficient as valuable buffer resources are being consumed until the congestion is detected and cells are removed by the processor. Typically, the polling is a processor background process that occurs fairly infrequently compared to the speed of traffic that may cause the congestion. Thus, a cleaning agent is not usually real-time to minimize resource use.

SUMMARY

It is therefore an intended advantage of one of the described embodiments to minimize the amount of buffer space used to store stale cells and increase overall efficiency of the switch by removing stored stale cells in a timely fashion.

It is a further intended advantage of the present invention to reduce the amount of processing needed to manage the removal of stale cells by providing information as to the status of the ports on the switch that are inactive and/or unreachable.

These and other intended advantages of the described embodiments are provided by detecting the status of a set of physical ports on an interface card in the network switch. If the status is determined to be in a first state that indicates that all physical ports in the interface card are inaccessible, then the network switch continues to accept all traffic for the set of physical ports.

The status may be in a first state due to either the interface being removed from the network switch or from the interface suffering a malfunction in hardware or software that is serious enough to disable all physical ports in the interface card.

Other features and advantages of the present invention will be apparent from the accompanying drawings and from the detailed description which follows below.

BRIEF DESCRIPTION OF THE DRAWINGS

The present invention is illustrated by way of example and not limitation in the figures of the accompanying drawings in which like references indicated similar elements and in which.

DETAILED DESCRIPTION

To allow the removal of stale cells, the system checks the status of an interface card. If the interface card is removed or malfunctioning such that none of the physical ports are present or operating, respectively, then the system still continues to accept cells directed at the physical ports of the interface card. These cells are "discarded" from the queue as if they were being transmitted. In protocols requiring an acknowledgment, the discarding of the cell from the queue has the same effect as if the cell was not transmitted due to being stuck in the queue. In either case, there would not be an acknowledgement from the recipient and the sender would detect that the recipient is unreachable.

Figure 1:
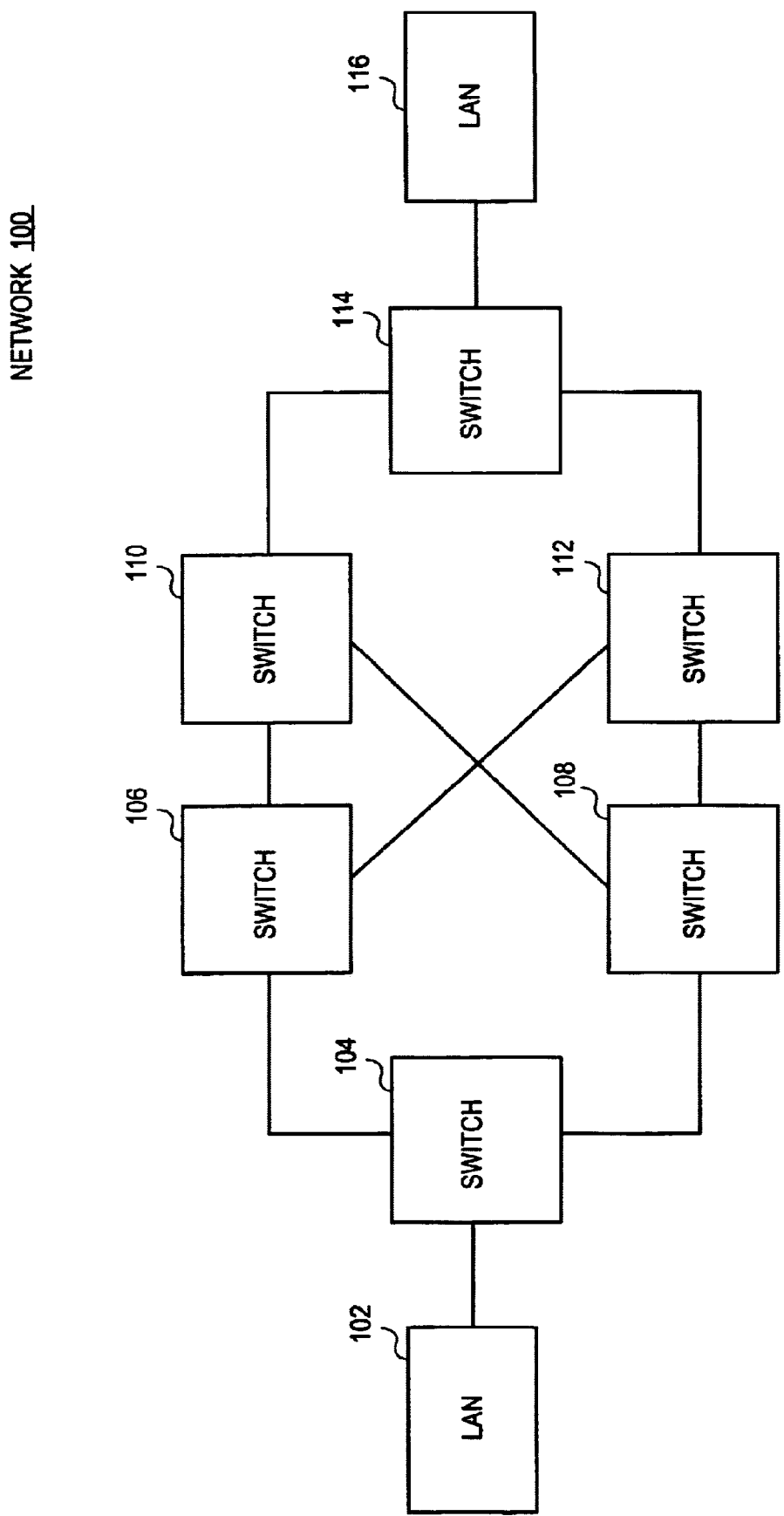
FIG. 1 is a block diagram of a network in which a network switch configured in accordance with one embodiment of the present invention may be used.

FIG. 1 contains a block diagram of a network 100 in which a network switch configured in accordance with the present invention may be implemented. Network 100 contains a first local area network (LAN) 102 connected to a first switch 104. First switch 104 is itself connected to a second switch 106 and a third switch 108. Second switch 106 and third switch 108 are interconnected with a fourth switch 110 and a fifth switch 112, which in turn are connected to a sixth switch 114. Sixth switch 114 is coupled to a second LAN 116.

For other embodiments, there may be any number of switches in network 100, including as few as a single switch, and the actual number of switches in any network are an implementation consideration. For one embodiment, the system can be used at the switch level, and may be used in every single switch in network 100. In addition, there may be multiple LAN's coupled to first switch 104 and sixth switch 114.

Figure 2:
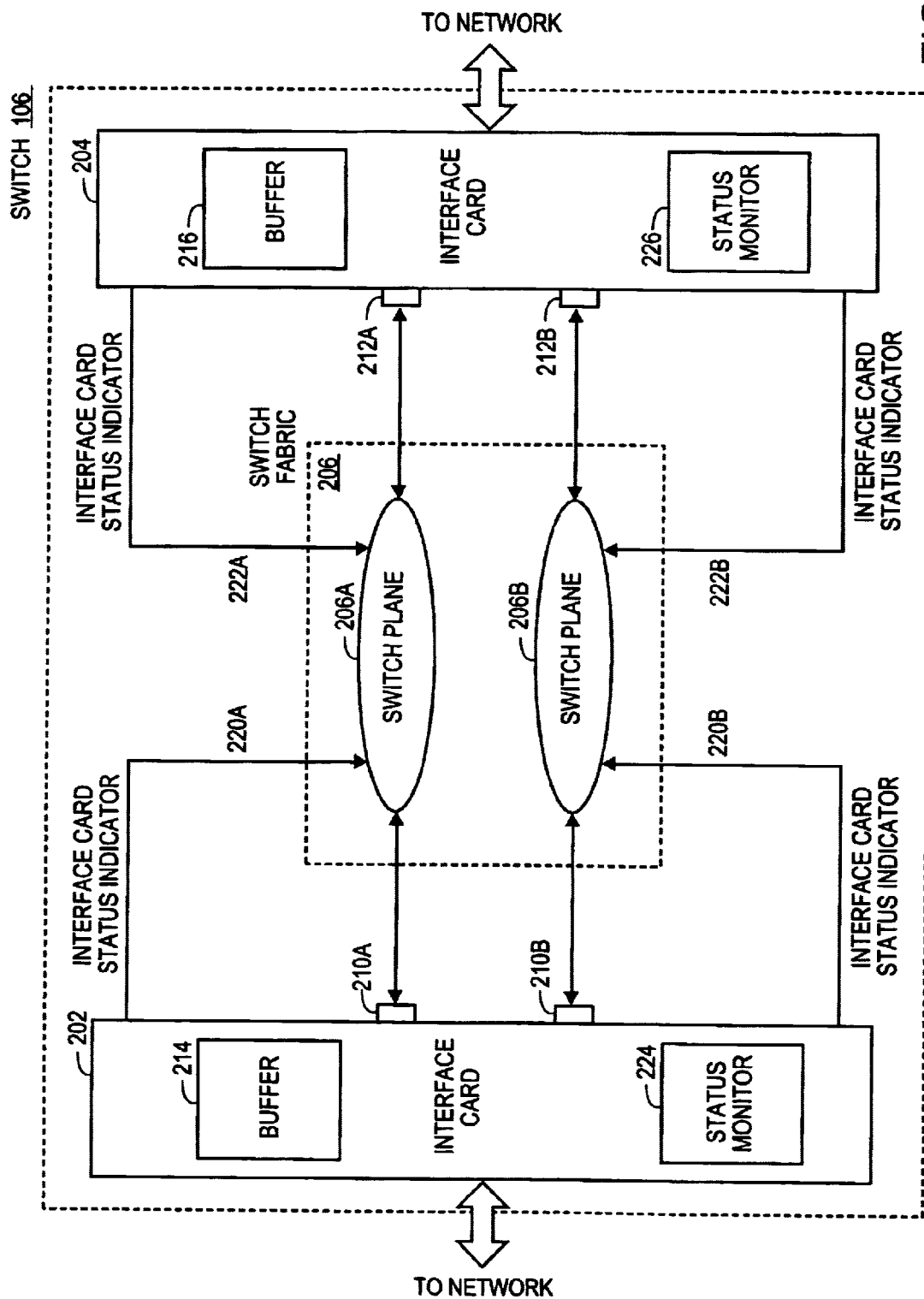
FIG. 2 is a block diagram of a network switch configured in accordance with one embodiment of the present invention.

FIG. 2 is a block diagram of second switch 106 configured in accordance with one embodiment of the present invention. Second switch 106 contains a first interface card 202, a second interface card 204, and a set of switch planes 206. For one embodiment, first interface card 202 and second interface card 204 are line cards providing connectivity for second switch 106 to ATM networks or frame relay networks and allows second switch 106 to switch ATM cells or frame relay traffic, respectively. For other embodiments, multiple interface cards may be used to interface with different networks. For example, a third interface card (not shown) may be inserted into second switch 106 and be configured to couple to local area networks, such as a network implemented using the Institute of Electrical and Electronic Engineers (IEEE) 802.3 standard (i.e., Ethernet), published July 1996.

First interface card 202 contains a first port 210 and second interface card 204 contains a second port 212. First port 210 is made up of a set of physical ports, including physical port 210a and physical port 210b, which is connected to the switch fabric, as described below. Second port 212 also has a set of physical ports, including physical ports 212a and 212b, which is also connected to the switch fabric. In addition, both first interface card 202 and second interface card 204 contain a buffer 214 and a buffer 216, respectively, each of which is used to store cells used in processing.

Set of switch planes 206 interconnects the physical ports of first interface card 202 and second interface card 204 through a set of links. For one embodiment, each switch plane in set of switch planes 206 couples each physical port in first port 210 to each physical port in second port 212. For example, switch plane 206a interconnects physical port 210a to physical port 212a.

First interface card 202 contains a status monitor unit 224. Second interface card 204 contains a status monitor unite 226. For one embodiment, the status monitor units operate as each interface card also provides an interface card status indicator to each switch plane. First interface card 202 provides an interface card status indicator 220a and an interface card status indicator 220b to switch plane 206a and switch plane 206b, respectively. Similarly, second interface card 204 provides an interface card status indicator 222a and an interface card status indicator 222b to switch plane 206a and switch plane 206b, respectively. In other configurations, statue monitor unit 224 and status monitor unit 226 may be located off of interface card 202 and interface cart 206, respectively. In addition, in yet another configuration, there may be a single status monitor unit that handles the status monitoring of multiple interface cards and/or the system.

Status monitor unit 224 and status monitor unit 226 each contain environmental monitors to monitor the voltage supply and other critical voltages, temperature and the network clock to ensure proper functioning. Any failure in the interface card will trigger the status indicator signal. In the embodiment where the status monitor units are located off of the interface card, then the status monitor units may also report not receiving the card present signal. For example, if the status monitor unit for each interface card is located in the chassis that contains the interface cards, the status monitor units may then be responsible for monitoring for the actual presence of the interface cards in addition to the status of the cards.

For one embodiment, all the interface card status indicators for an interface card provide the same signal to all switch planes. For this embodiment, the interface card status indicators may only indicate the status (e.g., availability) of the physical ports of the interface card as a whole and may not indicate the status of each physical port on the interface card. For example, interface card status indicator 222a and interface card status indicator 222b provide the same signal to switch plane 206a and switch plane 206b, respectively, to indicate whether second interface card 204 is present and operational in switch 106.

During operation, if an interface card becomes disabled and may no longer handling traffic, then the interface card status indicator for that interface card indicates to each switch plane in the switch fabric that the interface card is unavailable. The switch fabric then still continues to grant requests to any traffic destined for the unreachable destination ports as if the destination port is still reachable. Thus, cells that would have become stale cells and taken up space in the buffer of the sending interface card are now removed from the buffer.

For example, if interface card 204 becomes disabled or is removed, then interface card status indicator 222a and interface card status indicator 222b notifies to switch plane 206a and switch plane 206b, respectively, that interface card 204 is not available. However, even though interface card 204 is not present, switch plane 206a and switch plane 206b still accept traffic from interface card 202 for the physical ports of interface card 204 (i.e., physical port 212a and physical port 212b). Thus, cells that would have been queued up in buffer 214 and became stale are now removed from buffer 214.

For another embodiment, each interface card status indicator provide independent signals to each switch planes as to the status of the interface card. Providing independent signals to each of the switch planes allows the continued switching of the traffic to and from an interface card unless all of the physical ports of the interface card becomes non-functional. For example, if physical port 212a and physical port 212b are destination ports for traffic from physical ports 210a and physical ports 210b, then interface card status indicator 222a and interface card status indicator 222b provide independent signals to switch plane 206a and switch plane 206b to indicate the operating status of the destination physical ports. If only one destination port (e.g., physical port 212a) becomes non-functional, then switch plane 206b may still be able to send traffic from first interface card 202 to second interface card 204 using physical port 212b.

A failure or unavailability of all the ports in an interface card (such as the interface card being removed) is different from a failure of a subset the ports in the interface card. In the latter situation, the switch fabric may still service the traffic that is queued up in the buffer of the interface card sending traffic as some of the links may still transfer traffic. In the former situation, without the present invention, the buffer of the interface card sending traffic is, over time, filled-up by cells that cannot be sent as the destination port is not available.

In the system, the cells for an unreachable destination port are "removed" in real-time as cells received for unreachable destination ports are simply discarded by the switch fabric once they are accepted.

Figure 3:
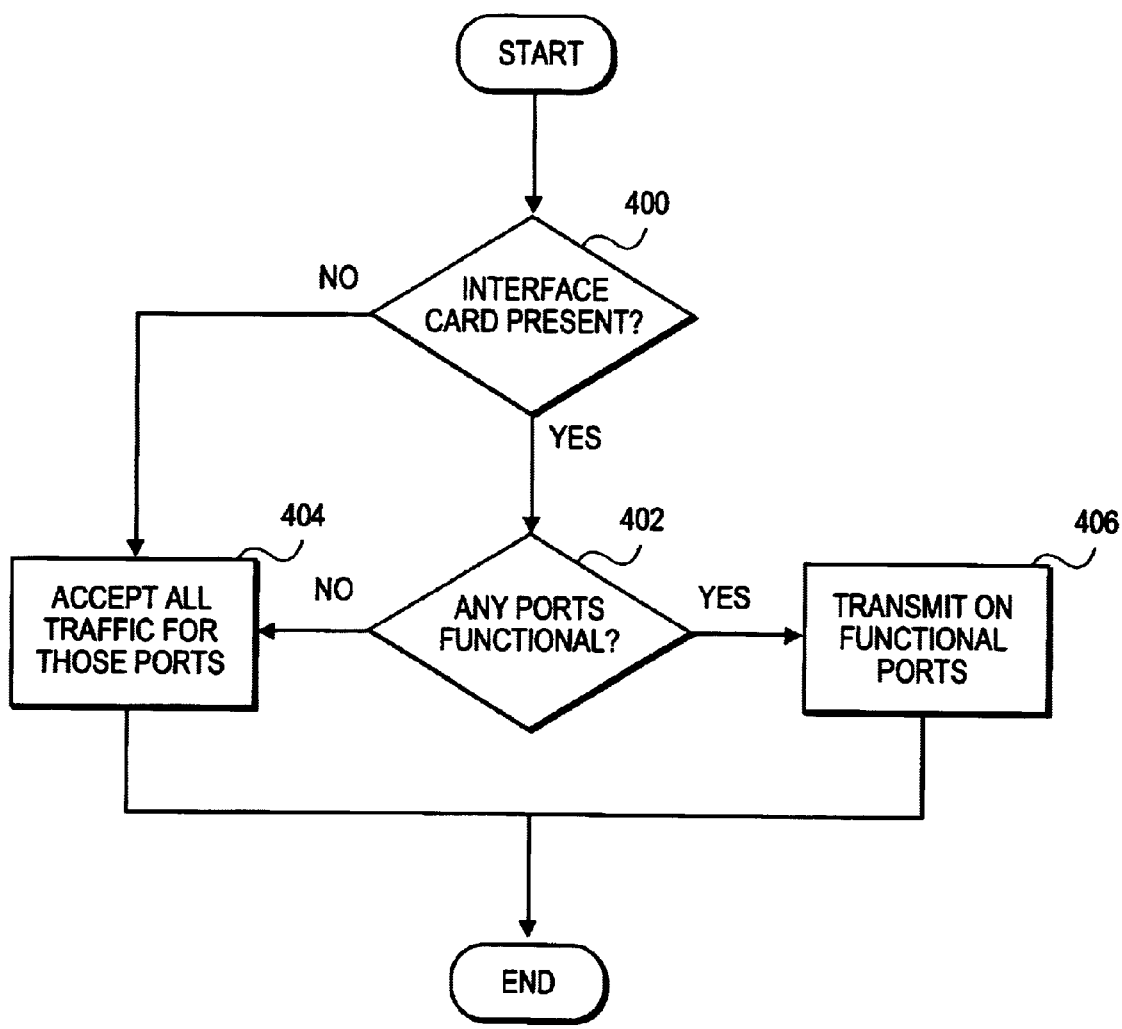
FIG. 3 is a flow diagram of one method of operation of a network switch configured in accordance with one embodiment of the present invention.

FIG. 3 is a flow diagram illustrating one method of operation of the present system for handling data that is sent to non-existent destinations. The flow diagram begins where a cell has been received by the system to be sent towards a particular destination (or logical) port. In block 400, switch fabric 206 determines if an interface card responsible for the particular logical port is present in the system. A logical port is made up of one or more physical ports. For example, if data is being sent to either physical port 210a or 210b, then the system will determine if first interface card 202 is present. If the appropriate interface card is present, then operation continues with block 402. Otherwise, operation continues with block 404.

In block 402, if the interface card is present, then the system will determine if any of the physical ports on the interface card are operational. Thus, switch fabric 206 checks to see if any physical port on first interface card 202 is able to transmit data. If so, operation continues with block 406. Otherwise, if none of the physical ports are functional, then operation continues with block 404.

In block 404, it has been determined by the system that the interface card containing the appropriate port is either: (1) not present; or, (2) even though the interface card is present, none of the physical ports corresponding to the logical port are operational. In case (1), the interface card is either physically unavailable (e.g., removed for servicing), or is malfunctioning (e.g., suffering a hardware error). In case (2), the interface card is present and may be operational except for the logical port that has been chosen as the destination. The error may be due to where the physical ports belonging to the destination logical port are either unable to transmit data (e.g., bad link) or is physically malfunctioning. When it is determined that the physical ports are non-operational for any of the above reasons, switch fabric 206, instead of denying the transmitting interface card access to that destination port (which causes the transmitting interface card to unnecessarily queue up cells and waste buffer space), continues to accept traffic for that destination port. Once switch fabric 206 accepts the data, switch fabric 206 discard the data. Thus, the transmitting card does not continue to buffer non-transmittable cells due to non-existent destination ports.

In block 406, at least one of the physical ports in the logical destination port on the interface card is functional and able to receive data to be transmitted, as determined in block 402. Thus, the switch fabric will transfer the information to the interface card for transmission on a functional physical port.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method of managing a network switch comprising:
    detecting, at a switch fabric that switches traffic received by the network switch, a status of a set of physical ports on an interface card in the network switch;
    determining from the status that the set of physical ports is inaccessible
    accepting, at the switch fabric, all traffic destined for the set of physical ports; and
    discarding, at the switch fabric, all of the traffic destined for the set of physical ports.

2. The method of claim 1, wherein the status further comprises a card present signal.

3. A method of controlling a communications switching apparatus, comprising:
    receiving a signal at a switch fabric included within the communications switching apparatus, the signal indicating that a first set of ports on an interface card contained in the communications switching apparatus is unreachable, the signal also indicating that a second set of ports on the interface card are functioning properly;
    accepting, at the switch fabric, traffic destined for the first set of ports and traffic destined for the second set of ports; and
    discarding at the switch fabric the traffic destined for the first set of ports and switching at the switch fabric the traffic destined for the second set of ports to the second set of ports.

4. A communications network, comprising:
    a first network;
    a second network;
    a communications switching apparatus having:
        a first interface coupled to the first network;
        a second interface coupled to the second network; and,
        a switch fabric configured to transmit traffic between the first interface and the second interface, the switch fabric designed to: (i) accept traffic from the second interface that is destined for the first interface even if the first interface is non-functional; and (ii) discard the traffic in response to the first interface being non-functional; the switch fabric also designed to: (iii) accept traffic from the first interface that is destined for the second interface even if the second interface is non-functional; and, (iv) discard the traffic that is destined for the second interface in response to the second interface being non-functional.

5. The communications network of claim 4, wherein the switch fabric receives a first status indicator from the first interface and a receives a second status interface from the second interface.

6. A network switch, comprising:
   a first interface containing a first set of ports and a second set of ports; and
   a switch fabric coupled to the first interface and the second interface, the switch fabric configured to receive a status signal from the first interface that indicates when the first set of ports is unreachable, the switch fabric configured to accept traffic destined for the first set of ports and discard the traffic in response to the status signal, the switch fabric configured to accept and switch traffic destined for the second set of ports.

7. The network switch of claim 6, wherein the network switch further comprises at least one other interface that:
   1) receives at least a portion of the traffic that is destined for the first set of ports;
   2) includes a buffer that queues the traffic it receives including the at least a portion of the traffic that is destined for the first set of ports, the accepting by the switch fabric of the at least a portion of the traffic destined for the first set of ports preventing congestion of the buffer.

8. A network switch comprising:
   a first interface containing a set of ports;
   a second interface that receives traffic destined for the set of ports, the second interface including a buffer that queues the traffic; and,
   a switch fabric coupled to the first interface and the second interface, the switch fabric configured to receive a status signal from the first interface that indicates whether:
   (i) the set of ports is reachable; or,
   (ii) the set of ports is not reachable;
   the switch fabric configured to:
   (i) accept the traffic from the second interface regardless of whether or not the set of ports are reachable or unreachable as indicated by the status signal;
   (ii) switch the traffic to the first interface if the status signal indicates that the set of ports is reachable;
   (iii) discard the traffic if the status signal indicates that the first set of ports is not reachable.

9. The network switch of claim 8, wherein the status signal can indicate that the first interface is removed from the network switch, if the first interface is removed from the network switch, in which case, the set of ports is recognized as corresponding to all ports on the first interface.

10. An apparatus for managing a network switch comprising:
    means for detecting, at a switch fabric that switches traffic received by the network switch, a status of a set of physical ports on an interface card in the network switch;
    means for determining from the status that the set of physical ports is inaccessible;
    means for accepting, at the switch fabric, all traffic destined for the set of physical; and,
    means for discarding, at the switch fabric, all of the traffic destined for the set of physical ports.

11. The apparatus of claim 10, wherein the status further comprises a card present signal.

12. An apparatus of controlling a communications switching apparatus, comprising:
    means for receiving a signal at a switch fabric included within the communications switching apparatus, the signal indicating that a first set of ports on an interface card contained in the communications switching apparatus is in an inoperative state
    means for accepting, at the switch fabric, traffic destined for the first set of ports and traffic destined for the second set of ports; and
    discarding at the switch fabric the traffic destined for the first set of ports and switching at the switch fabric the traffic destined for the second set of ports to the second set of ports.

13. An article comprising a computer readable medium having instructions stored thereon, which when executed, causes:
    determining if the status for a set of physical ports on an interface card in a network switch indicates that all physical ports in the interface card are inaccessible;
    accepting, at the switch fabric, all traffic destined for the set of physical ports;
    discarding at the switch fabric all of the traffic destined for the set of physical ports.

14. The article of claim 13, wherein the status further comprises a card present signal.

* * * * *